United States Patent
Iyer et al.

(10) Patent No.: US 7,171,420 B2
(45) Date of Patent: Jan. 30, 2007

(54) METHOD AND SYSTEM FOR UTILIZING A DATABASE AS A SERVICE

(75) Inventors: Balakrishna Raghavendra Iyer, San Jose, CA (US); Charles William Lickel, San Jose, CA (US); Dante Aligheri Aubert, San Jose, CA (US); Vahit Hakan Hacigumus, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 09/966,624

(22) Filed: Sep. 27, 2001

(65) Prior Publication Data

US 2003/0061218 A1    Mar. 27, 2003

(51) Int. Cl.
*G06F 17/30* (2006.01)

(52) U.S. Cl. .................. 707/102; 707/9; 707/10; 707/2; 707/3; 707/4; 707/5

(58) Field of Classification Search .......... 707/10, 707/104.1, 9, 102, 2, 3, 4, 5; 709/226; 705/405
See application file for complete search history.

(56) References Cited

U.S. PATENT DOCUMENTS

| | | | |
|---|---|---|---|
| 4,751,635 A | 6/1988 | Kret | 364/200 |
| 5,442,791 A | 8/1995 | Wrabetz et al. | 242/141 |
| 5,473,630 A * | 12/1995 | Penzias et al. | 379/114.02 |
| 5,584,025 A * | 12/1996 | Keithley et al. | 707/104.1 |
| 5,606,693 A | 2/1997 | Nilsen et al. | 395/610 |
| 5,646,982 A * | 7/1997 | Hogan et al. | 379/88.22 |
| 5,668,986 A | 9/1997 | Nilsen et al. | 395/610 |
| 5,696,965 A * | 12/1997 | Dedrick | 707/10 |
| 5,737,592 A * | 4/1998 | Nguyen et al. | 707/4 |

(Continued)

FOREIGN PATENT DOCUMENTS

WO    WO 01/84517 A2 *    8/2001

OTHER PUBLICATIONS

Lambert, Derwent on Delphion: An Experiment, Searcher, vol. 9 Issue 5, p. 10, 8p, 14c.*

(Continued)

*Primary Examiner*—Frantz Coby
(74) *Attorney, Agent, or Firm*—Sawyer Law Group LLP (57) ABSTRACT

A method and system for providing a database as a is disclosed. In a first aspect, the method comprises the steps of accessing the database over a public network by a browser without downloading software. The method further includes controlling access to the database on an agreed-upon schedule. In a second aspect, a database service for use on a public network is disclosed. The database service comprises a presentation layer, the presentation layer including a browser, a web server coupled to the public network and a web application platform coupled to the web server. The database includes an application layer comprising a user interface (UI) application. The UI application is executed on the web application platform and is capable of communicating with the browser through a standard program code. Finally, the database service includes a database management layer. The database management layer includes at least one database which communicates with the UI application. Accordingly, a database can be managed centrally while resources of the database can be consumed individually and globally.

24 Claims, 5 Drawing Sheets

U.S. PATENT DOCUMENTS

| | | | |
|---|---|---|---|
| 5,953,719 A | 9/1999 | Kleewein et al. | 707/8 |
| 5,966,707 A | 10/1999 | Van Huben et al. | 707/10 |
| 5,999,941 A | 12/1999 | Andersen | 707/103 |
| 6,003,047 A | 12/1999 | Osmond et al. | 707/513 |
| 6,006,195 A * | 12/1999 | Marchak et al. | 705/9 |
| 6,058,373 A * | 5/2000 | Blinn et al. | 705/26 |
| 6,076,110 A * | 6/2000 | Murphy et al. | 709/228 |
| 6,138,104 A * | 10/2000 | Marchak et al. | 705/9 |
| 6,195,646 B1 * | 2/2001 | Grosh et al. | 705/26 |
| 6,246,997 B1 | 6/2001 | Cybul et al. | 705/27 |
| 6,253,254 B1 | 6/2001 | Erlenkoetter et al. | 709/316 |
| 6,263,433 B1 | 7/2001 | Robinson et al. | 713/100 |
| 6,289,382 B1 * | 9/2001 | Bowman-Amuah | 709/226 |
| 6,292,801 B1 | 9/2001 | Campbell et al. | 707/10 |
| 6,522,971 B1 * | 2/2003 | Tanaka | 701/209 |
| 6,526,335 B1 * | 2/2003 | Treyz et al. | 701/1 |
| 6,526,438 B1 * | 2/2003 | Bienvenu et al. | 709/219 |
| 6,542,589 B1 * | 4/2003 | Baskin | 379/114.05 |
| 6,616,701 B2 * | 9/2003 | Doyle | 715/501.1 |
| 6,662,231 B1 * | 12/2003 | Drosset et al. | 709/229 |
| 6,690,934 B1 * | 2/2004 | Conrad et al. | 455/427 |
| 6,697,849 B1 * | 2/2004 | Carlson | 709/219 |
| 6,704,117 B1 * | 3/2004 | Chintakrindi et al. | 358/1.15 |
| 6,732,179 B1 * | 5/2004 | Brown et al. | 709/229 |
| 6,741,841 B1 * | 5/2004 | Mitchell | 455/188.1 |
| 6,760,128 B2 * | 7/2004 | Jackson et al. | 358/453 |
| 6,795,830 B1 * | 9/2004 | Banerjee et al. | 707/200 |
| 6,954,737 B2 * | 10/2005 | Kalantar et al. | 705/50 |
| 7,076,467 B1 * | 7/2006 | Chatani | 705/52 |
| 2001/0034623 A1 * | 10/2001 | Chung | 705/5 |
| 2001/0037465 A1 * | 11/2001 | Hart et al. | 713/201 |
| 2001/0042002 A1 * | 11/2001 | Koopersmith | 705/10 |
| 2002/0010655 A1 * | 1/2002 | Kjallstrom | 705/27 |
| 2002/0032597 A1 * | 3/2002 | Chanos | 705/10 |
| 2002/0062224 A1 * | 5/2002 | Thorsen et al. | 705/2 |
| 2002/0103673 A1 * | 8/2002 | Atwood | 705/2 |
| 2003/0088534 A1 * | 5/2003 | Kalantar et al. | 706/50 |
| 2004/0177090 A1 * | 9/2004 | Corbett-Clark | 707/103 Z |
| 2004/0236619 A1 * | 11/2004 | Gundersen et al. | 705/8 |
| 2004/0260950 A1 * | 12/2004 | Ougi et al. | 713/201 |

OTHER PUBLICATIONS

Uncover Service Ceases Operation as Ingenta Launches an Enhanced Service, Online Libraries & Microcomputers: Jun. 2001, vol. 19 Issue 6/7, p. 3, 2p.*

N. Zingirian, et al., "Efficiency of Standard Software Architectures for Java-Based Access to Remote Databases," *High-Performance Computing and Networking*, Apr. 21-23, 1998, pp. 479-488.

Aslam, S., "WEB-Based Query Processing in a Database Course Project," *SIGCSE Technical Symposium on Computer Science Education*, Feb. 25-Mar. 1, 1998, pp. 297-301.

* cited by examiner

METHOD AND SYSTEM FOR UTILIZING A DATABASE AS A SERVICE

FIELD OF THE INVENTION

The present invention relates generally to the use of a database and more particularly to utilizing a database over a public network.

BACKGROUND OF THE INVENTION

Advances in fiber technology have made communications bandwidth significantly more affordable. The Internet phenomenon spurred the installation of high speed networking adapters to computers and the installation of high bandwidth transcontinental and international communication links. Because the Internet is a public access network, it has brought together computing service providers and computing service consumers in an unprecedented manner. Web based e-mail service, like those offered by AOL, Yahoo and Microsoft, is an example of how mail-server software is offered as a service. E-mail services are used from around the world. E-mail service deals with both reads and writes and transient storage. Recently, storage service providers have emerged who provide permanent storage and its management as a service. However, heretofore, databases have not been offered as a service to a plurality of users.

The problem with utilizing the public network to handle a database is the administration costs. That is, as is known, the code to produce the database is relatively easy to implement, as opposed to the amount of service time required when a problem occurs in the code. It is well known that for large blocks of code it is virtually and practically impossible to ensure there are no bugs therein. Therefore, it is very important for a database to have an administrator who manages resource allocations and failure situations. The administrator needs to be a database specialist who is capable of providing instant advice or correcting the code that is a problem. In addition, there are many versions of the database that may be used; for example, it is possible that a particular database needs to be supported by LINUX, by the Windows environment, by the Macintosh environment, and each of those versions would have problems that are unique to it. In addition, even within a particular type of code, such as the Windows operating environment, there may be different versions of that have different features that need to be debugged or the like. As a consequence, the critical cost in database management is the staff and the cost of the human beings associated with servicing the software. It is well known that there is a scarcity of skilled administrators and so it is also very difficult to find or pay for the cost of such administrators. Accordingly, given the present environment, it is not possible to provide a database that could be shared across multiple users without an extreme expense in human administration. As above mentioned, the administrator who would administer a database that would cover all versions and different types of operating systems would add a significant expense and would be difficult to retain in this type of environment.

One realizes that, as before mentioned, when developing database code a small percentage are working on the code, while a much larger percentage are providing service for particular customers. So, for example, if in a particular customer's installation, where a database is running in a Windows environment, but a certain version of Windows, say Windows 6.8 that includes patches particular to that database, and it is running on a particular kind of processor, then it requires a specialized administrator with the expertise to service such a database.

The problem has been identified by others. Others are automating the installation, administration and management tasks. This approach partially solves the problem since no one has found a totally automated solution. Because administration and management tasks are different in various application environments, it may not ever be possible to fully automate the tasks.

What is desired, therefore, is a system that would allow a database to be utilized across multiple environments without requiring the high administration expense. This system should be easy to implement, should be cost effective, and should not significantly affect the overall costs of such a database. The present invention addresses such a need.

SUMMARY OF THE INVENTION

A method and system for providing a database as a is disclosed. In a first aspect, the method comprises the steps of accessing the database over a public network by a browser without downloading software. The method further includes controlling access to the database on an agreed-upon schedule. In a second aspect, a database service for use on a public network is disclosed. The database service comprises a presentation layer, the presentation layer including a browser, a web server coupled to the public network and a web application platform coupled to the web server. The database includes an application layer comprising a user interface (UI) application. The UI application is executed on the web application platform and is capable of communicating with the browser through a standard program code. Finally, the database service includes a database management layer. The database management layer includes at least one database which communicates with the UI application. Accordingly, a database can be managed centrally while resources of the database can be consumed individually and globally. An end user or a consolidator of users purchases database service from the database provider on an agreed schedule. Parameters used to calculate billing may include the amount of computing resources, say disk, allocated to the end users, the network bandwidth made available to them for use, or optional management services like back-up, restore, performance tuning, etc.

DETAILED DESCRIPTION

The present invention relates generally to the use of a database and more particularly to utilizing a database over a public network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

To describe the features of the present invention in detail, refer now to the following discussion along with the accompanying figures.

Figure 1:
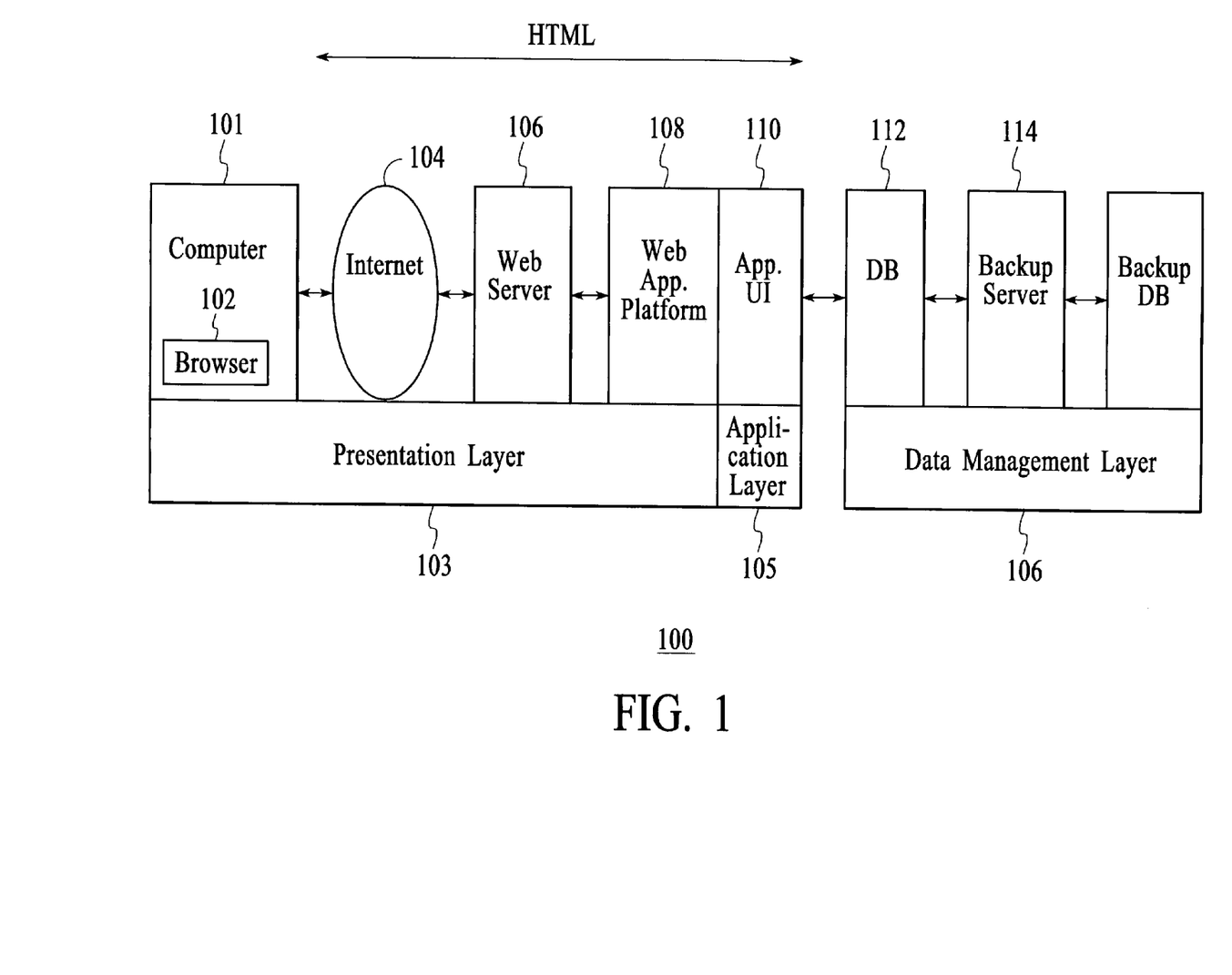
FIG. 1 illustrates a system for providing a database as a service in accordance with the present invention.

FIG. 1 illustrates a system 100 for providing a database as a service in accordance with the present invention. In a preferred embodiment, the browser 102 which is coupled to a computer 101 provides information to the public network 104, such as the Internet. The public network 104 in turn is coupled to the web server 106. The web server 106 in turn is in communication with an application platform 108 that includes the user interface (UI) application 110. In a preferred embodiment, the web application platform is Websphere™ by International Business Machines Corporation. The application user interface is in communication with a database 112, in this case DB2. The database 112 in turn is coupled to a backup database 114 to allow for redundancy if something happens to the database 112. In a preferred embodiment, the application platform 108, the UI application, and the database 112 would be within a service center.

The system 100 is implemented as a three-tier architecture, namely: a presentation layer 103, an application layer 105, and a data management layer 107. There are two benefits of separating system 100 into a three-tiered architecture. The first is the insulation of software components of one layer from another; the other is the separation of concerns that helps interoperability and higher scalability.

The presentation layer 103 includes a browser 102, the Internet 104, a web server 106 and a web application platform 108. The browser 102 is responsible for displaying the user interface and the web server 104 manages the communication between the browser 102 and the UI application 110. The platform 108 allows the UI application 110 to run. Connection, session management logic is provided by web application platform 108. The UI application 110 communicates with the database via a standard protocol, such as the JDBC protocol. The presentation layer 103, together with the UI application 110, is also responsible for user authentication, session management by using session IDs, and database connection management.

The application layer 107 comprises the user interface application 110 that in a preferred embodiment includes Java servlets that are managed by a servlet engine. Java is used for platform portability. In a preferred embodiment, in response to user interaction, the HTML code pages are generated and handed over to the presentation layer.

The data management layer 105 includes the database 112 and a backup/recovery server 114. The database 112 and the backup/recovery server 114 communicate, on a set schedule, through a private and secure high-speed network, without human involvement. In addition, the backup server 114 recovers the database to another server 115 thus providing a warm standby for the database. What is meant by a warm standby is that the database includes the latest information but may not be instantly accessible.

Figure 2:
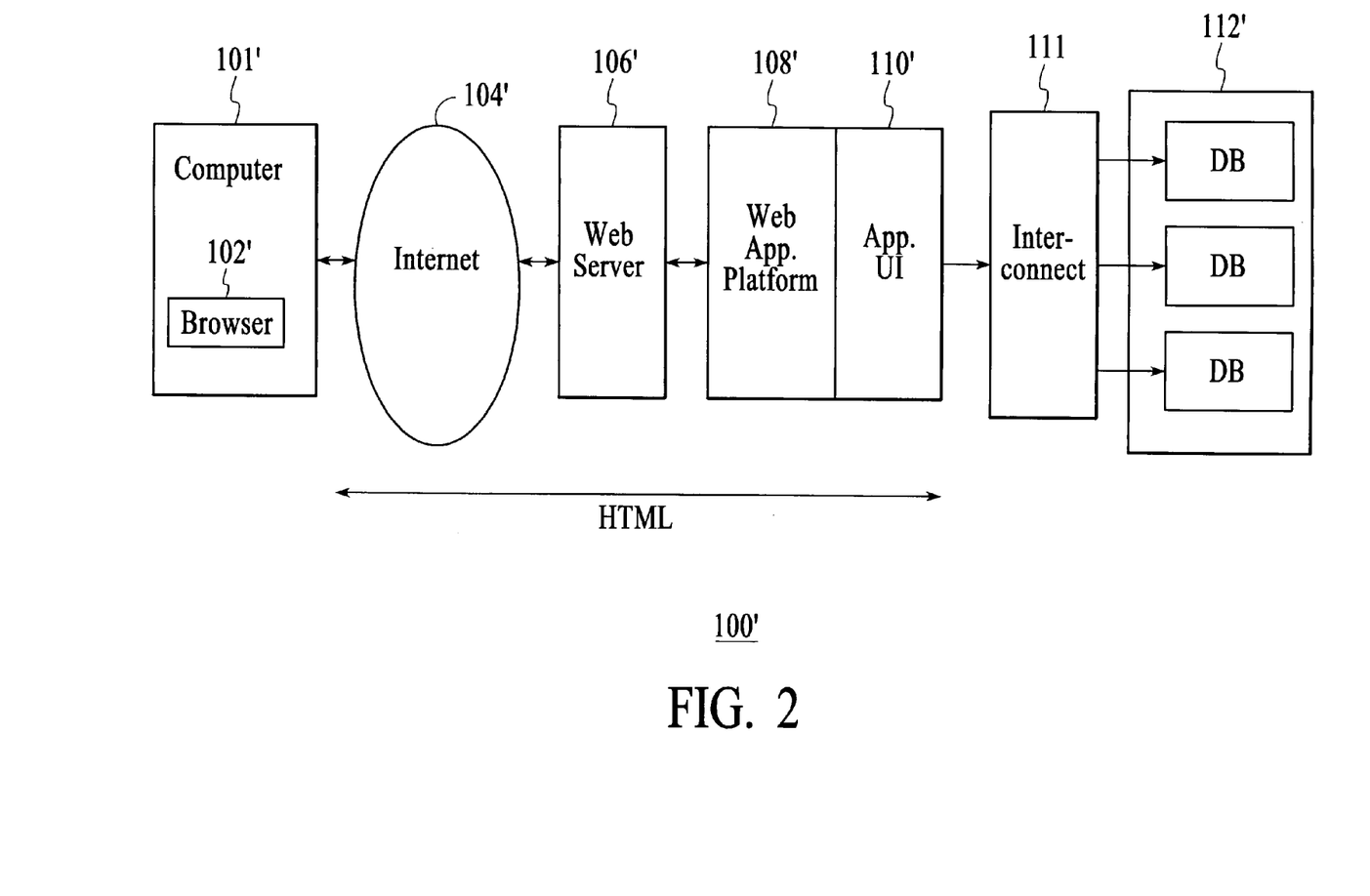
FIG. 2 illustrates a system for providing a database as a service that includes a plurality of databases.

One recognizes that although FIG. 1 illustrates one instance of the database 112, the key element is that the database be in one place. FIG. 2 illustrates a system 100' for providing a database as a service that includes a plurality of databases 112' which are coupled to the UI application 110' by interconnect 111. Accordingly, it is readily apparent, that as long as the database service can be provided at a local site and then distributed globally, that its use would be within the spirit and scope of the present invention. Similarly, since the desire is to minimize the number of people required to provide database administration, the optimum number of database administrators is one. However, it may be that one individual is not capable of managing all of the service issues and in the above-identified system of FIG. 2 it would be possible to have an administrator that manages each database or a group of the databases. As before mentioned, the key feature is that the databases are housed in facilities that will allow for efficient management thereof.

To describe the operation of the system in more detail, refer now to the following discussion in conjunction with the accompanying Figures.

Figure 3:
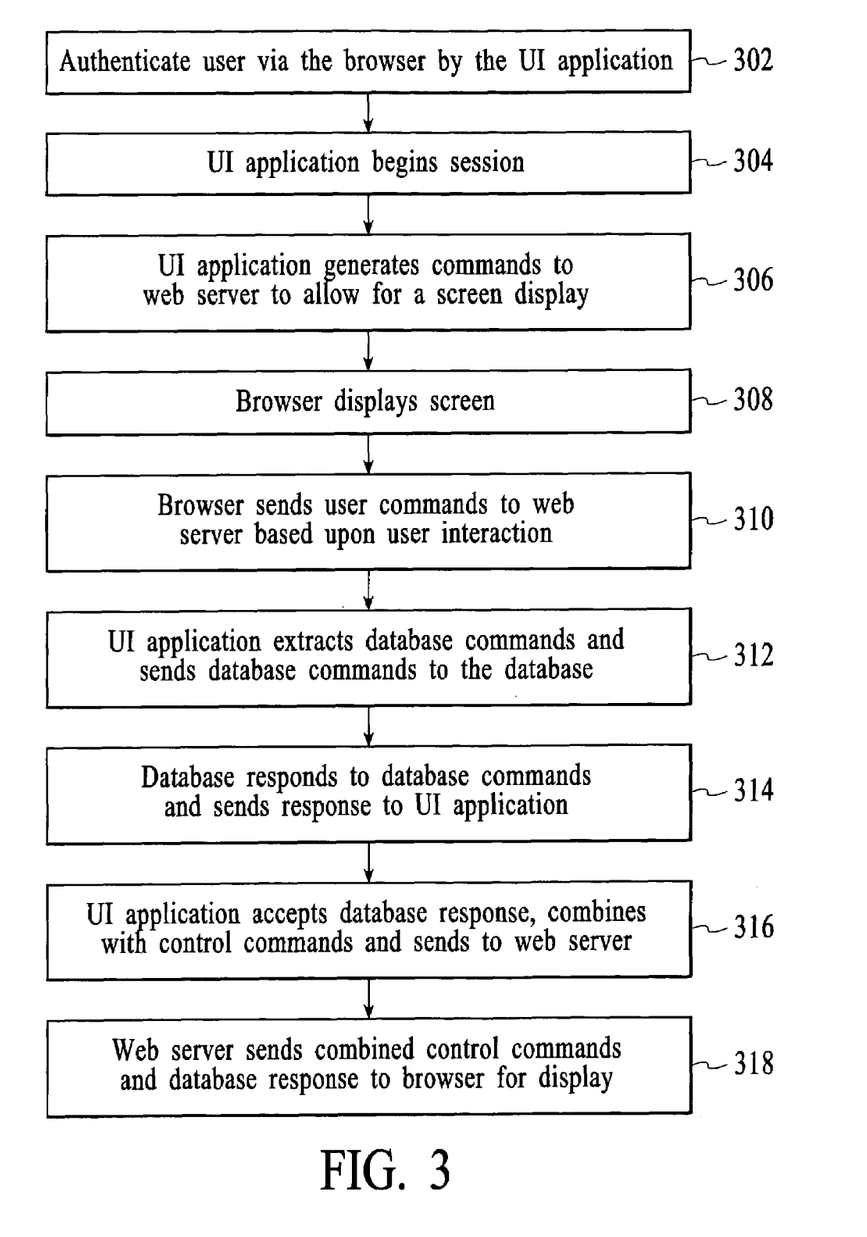
FIG. 3 is a simple flow chart of the system for providing a database as a service in accordance with the present invention.

FIG. 3 is a simple flow chart of the system for providing a database as a service in accordance with the present invention. First, the user, via the browser, is authenticated by the UI application, via step 302. The UI application then begins a session, via step 304. Thereafter the UI application generates commands to the web server to allow for a screen display, via step 306. The web server then causes the browser to display the screen, via step 308. The browser then sends user commands to web server based upon user interactions, via step 310. The UI application then extracts database commands from the web server and sends the database commands to the database, via step 312. The database responds to database commands and send a response to UI application, via step 314. The UI application accepts database response and combines the database response with control commands (HTML code) and sends to web server via step 316. The web server then sends the database response and other commands to browser for display, via step 318.

Referring back to FIG. 1, after the browser completes the changes to the database 112, the database is then copied to the backup database 114. In so doing, the changes can be accessed even if the primary database is out of service. In a preferred embodiment, the backup database would be located at a separate location from the service center to allow for access thereto if the service center is inaccessible.

For a description of a preferred embodiment of the system and method for providing a database service in accordance with the present invention, refer now to the following discussion.

Figure 4:
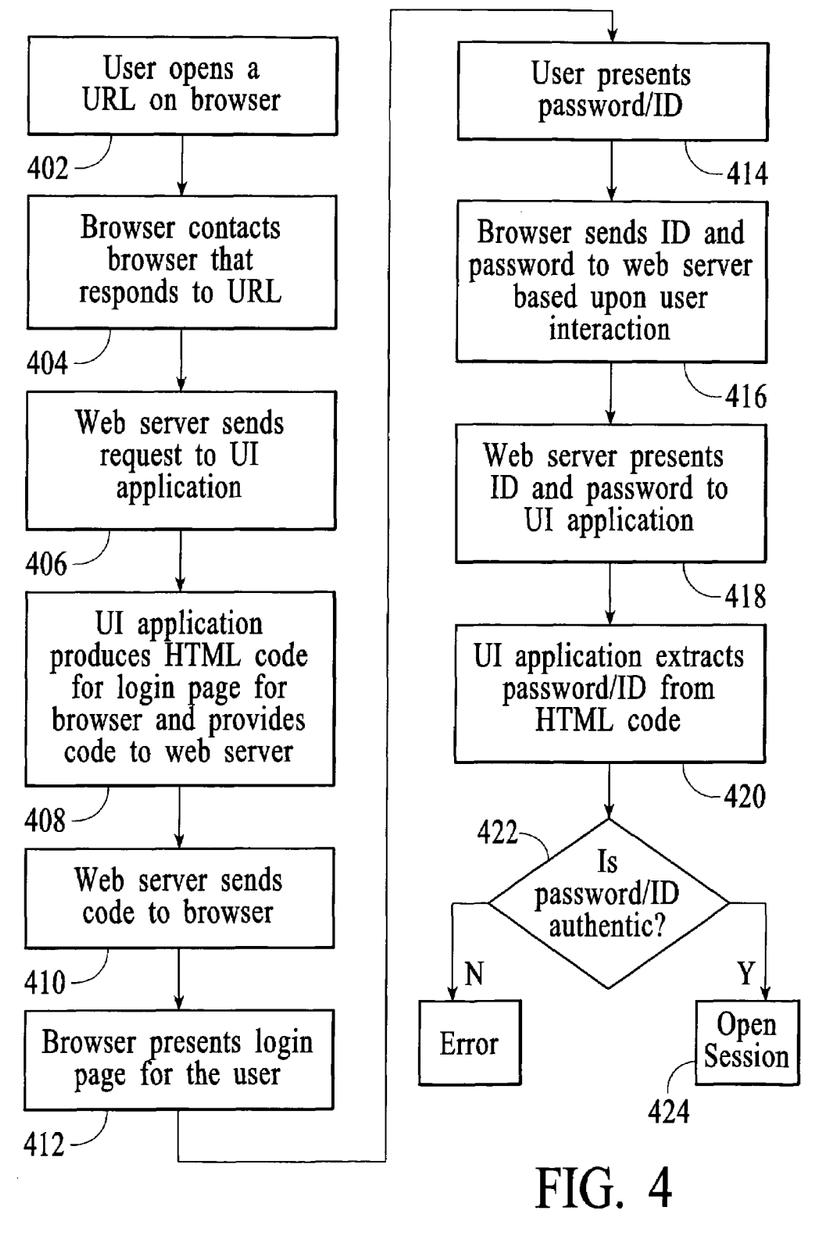
FIG. 4 is a detailed flow chart for authenticating a user in accordance with the present invention.
Figure 5:
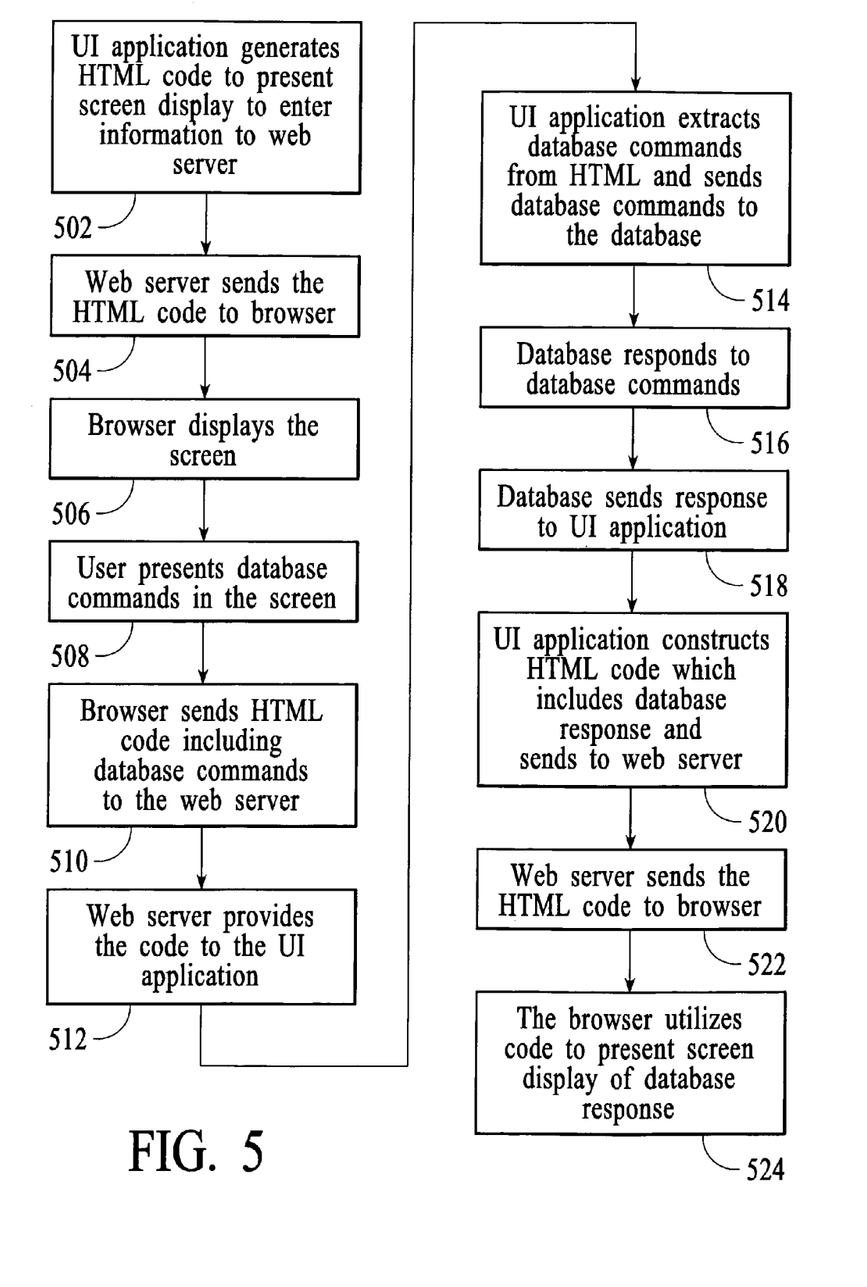
FIG. 5 is a detailed flow chart of the web browser handling the database after authentication.

FIGS. 4 and 5 are more detailed flow charts that illustrate the use of a database as a service in accordance with the present invention. FIG. 4 is a detailed flow chart for authenticating a user in accordance with the present invention. First, a user opens a URL on the browser, via step 402. Next, the browser contacts the web server at the given URL, via step 404. Thereafter, the web server sends a request to UI application, via step 406. The UI application produces a hypertext markup language (HTML) code for the login page for the browser and then provides this HTML code to the web server, via step 408.

The HTML code is utilized in a preferred embodiment, since all browsers can handle the code. One of ordinary skill in the art readily recognizes, however, any code that performs the same function which can be utilized on any browser would be within the spirit and scope of the present invention.

Next, the web server sends the HTML code to the browser, via step 410. The browser then presents a login page to the user, via step 412. In response, the user presents a password and ID, via step 414 The browser then sends the HTML code to the web server via user interaction, step 416. The HTML code contains the user ID/password.

The web server then presents the HTML code containing the user ID and password to the UI application, via step 418. The UI application extracts the user ID/password, via step 420. Finally the UI application determines if the user is authentic, via step 422. If the user is not authenticated, then end. If authentication succeeds, then the UI application opens a session (connection), via step 424. A session is then established and the user is connected to the database.

FIG. 5 is a detailed flow chart of the web browser handling the database after authentication. First, the UI application generates the HTML code that presents a screen display for the user to enter information (information would be database commands) and gives to the web server, via step 502. The web server then sends the HTML code to the browser, via step 504. The web browser displays the UI screen, via step 506. The user presents SQL or other database commands in locations on the screen or window, via step 508.

The web browser then sends the HTML code to the web server, via step 510. The web server accepts the HTML code and provides the code to the UI application, via step 512. The UI application extracts database commands from the HTML code, and sends database commands it to the database, via step 514. The database then responds to the database commands, via step 516. The database sends a response to UI application, via step 518. The UI application constructs the HTML code and sends to web server, via step 520. The web server sends the HTML code that includes the database response to the browser, via step 522. The browser utilizes the HTML code to present a screen display of database response, via step 524. This process can be utilized, as long as the session is active, to manage the database to change and update information therein. In a preferred embodiment, a session would be active until either the user closes the session or when a predetermined time period has elapsed with no activity.

A system and method in accordance with the present invention allows a database to be offered as a service. An end user or a consolidator of users purchases database service from the database provider on an agreed schedule. Parameters used to calculate billing may include the amount of computing resources, say disk, allocated to the end users, the network bandwidth made available to them for use, or optional management services like back-up, restore, performance tuning, etc.

Specifically, the installed web infrastructure is leveraged to deliver database service. Without downloading any software on their client (not even a database client) by a web browser, the database functionality is offered to the end user. The end user opens a URL, and is presented with a user interface through which the user types in a database language (such as SQL) statement or a set of statements and other database commands. These commands are captured on a server by logic and sent to a database. The results from the database are formatted appropriately and sent to the client's web browser for display. In addition, industry standard protocols like JDBC and ODBC that have the capability to make remote procedure calls to databases over the Internet are also supported by the database service.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a database utilizing a computer which includes a browser, the method comprising:
 (a) authenticating a user via the browser by a user interface (UI) application;
 (b) providing commands from a web server over a public network to the browser for displaying a screen;
 (c) providing commands from the browser to the web server based upon user interaction with the screen, the commands from the browser including database commands;
 (d) extracting and sending the database commands by the UI application to the database over the public network, the database providing a response thereto;
 (e) combining the response with control commands by the UI application;
 (f) sending the combined response and control commands through the web server to the browser for display, wherein the database is accessed over the public network by the browser without downloading database software; and
 (g) controlling usage of the database based on an agreed-upon schedule and price.

2. The method of claim 1 wherein the commands are provided in hypertext markup language (HTML) code.

3. The method of claim 1 wherein the database commands are structured query language (SQL) statements.

4. The method of claim 1 wherein the screen is a window to enter database commands.

5. The method of claim 1 wherein the UI application is executed as a web application platform.

6. The method of claim 5 wherein the authentication step (a) comprises the steps of:
 (a1) opening a uniform resource locator (URL) in the browser;
 (a2) sending the URL to the web server;
 (a3) sending a request to the UI application based upon the URL;
 (a4) producing the HTML code for login and providing the HTML code to the browser;
 (a5) providing identification (ID)/password in the HTML code based upon user interaction by the browser;
 (a6) extracting ID/password from the HTML code by UI application; and
 (a7) determining if ID/password is authentic.

7. The method of claim 6 wherein the authentication step (a) further comprises the steps of:
 (a8) opening a session if the ID/password is authentic.

8. A computer readable medium containing program instructions for providing a database utilizing a computer which includes a browser, the program instructions for:
 (a) authenticating a user via the browser by a user interface (UI) application;
 (b) providing commands from a web server over a public network to the browser for displaying a screen;
 (c) providing commands from the browser to the web server based upon user interaction with the screen, the commands from the browser including database commands;
 (d) extracting and sending the database commands by the UI application to the database over the public network, the database providing a response thereto;
 (e) combining the response with control commands by the UI application;

(f) sending the combined response and control commands through the web server to the browser for display, wherein the database is accessed over the public network by the browser without downloading database software; and (g) controlling usage of the database based on an agreed-upon schedule and price.

9. The computer readable medium of claim 8 wherein the commands from a web server, the commands from the browser, and the control commands are provided in hypertext markup language (HTML) code.

10. The computer readable medium of claim 8 wherein the database commands are structured query language (SQL) statements.

11. The computer readable medium of claim 8 wherein the screen is a window to enter database commands.

12. The computer readable medium of claim 8 wherein the UI application is executed as a web application platform.

13. The computer readable medium of claim 12 wherein the authentication instruction (a) comprises the instructions for:

(a1) opening a uniform resource locator (URL) in the browser;

(a2) sending the URL to the web server;

(a3) sending a request to the UI application based upon the URL;

(a4) producing the HTML code for login and providing the HTML code to the browser;

(a5) providing identification (ID)/password in the HTML code based upon user interaction by the browser;

(a6) extracting ID/password from the HTML code by UI application; and (a7) determining if ID/password is authentic.

14. The computer readable medium of claim 13 wherein the authentication instruction (a) further comprises the instruction for:

(a8) opening a session if the ID/password is authentic.

15. A database service comprising:

a presentation layer, the presentation layer including a browser, a web server coupled to a public network and a web application platform coupled to the web server;

an application layer comprising a user interface (UI) application, the UI application is executed on the web application platform and is capable of communicating with the browser through hypertext markup language (HTML) code; and a database management layer, the database management layer comprising at least one database which communicates with the UI application over the public network; and at least one back up database coupled to the at least one database, wherein the UI application extracts database commands from the web server and presents the database commands to the database and combines database commands with control commands from the database and provides the HTML code to the server, wherein the database is accessed over the public network by the browser without downloading database software, and wherein usage of the database is based on an agreed-upon schedule and price.

16. The method of claim 1 wherein the usage of the database is controlled based on mutually agreed-upon criteria between a provider of the database and the user.

17. The method of claim 16 wherein the mutually agreed-upon criteria is cost-based.

18. The method of claim 16 wherein the mutually agreed upon criteria is time-based.

19. The computer readable medium of claim 8 wherein the usage of the database is controlled based on mutually agreed-upon criteria between a provider of the database and the user.

20. The computer readable medium of claim 19 wherein the mutually agreed-upon criteria is cost-based.

21. The computer readable medium of claim 19 wherein the mutually agreed upon criteria is time-based.

22. The database service of claim 15 wherein the usage of the database is controlled based on mutually agreed-upon criteria between a provider of the database and the user.

23. The database service of claim 22 wherein the mutually agreed-upon criteria is cost-based.

24. The database service of claim 22 wherein the mutually agreed upon criteria is time-based.

* * * * *